US012608991B2

(12) United States Patent
Ward

(10) Patent No.: US 12,608,991 B2
(45) Date of Patent: Apr. 21, 2026

(54) DYNAMIC MULTI-FACTOR AUTHENTICATION FOR PREMISES ACCESS

(71) Applicant: The ADT Security Corporation, Boca Raton, FL (US)

(72) Inventor: Shy Ward, Flower Mound, TX (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/741,223

(22) Filed: Jun. 12, 2024

(65) Prior Publication Data

US 2025/0384727 A1 Dec. 18, 2025

(51) Int. Cl.

| | |
|---|---|
| ***G07C 9/38*** | (2020.01) |
| ***G07C 9/00*** | (2020.01) |
| ***G08B 13/22*** | (2006.01) |

(52) U.S. Cl.

CPC ........... *G07C 9/38* (2020.01); *G07C 9/00563* (2013.01); *G07C 9/00571* (2013.01); *G07C 9/00658* (2013.01); *G08B 13/22* (2013.01); *G07C 2209/04* (2013.01)

(58) Field of Classification Search

None

See application file for complete search history.

(56) References Cited

U.S. PATENT DOCUMENTS 5,687,094 A * 11/1997 Kagawa .................. G06F 30/20 716/112
7,825,796 B1 * 11/2010 Simon .................... G08B 25/14 340/3.3
7,904,097 B2 * 3/2011 Misikangas ......... G01S 5/02524 455/403
8,811,958 B2 * 8/2014 Suzuki ............... G06Q 30/0205 455/414.1

(Continued)

FOREIGN PATENT DOCUMENTS

WO 2024068032 A1 4/2024

OTHER PUBLICATIONS

International Search Report and Written Opinion dated Aug. 18, 2025 for International Application No. PCT/US2025/033185 filed Jun. 11, 2025, consisting of 13 pages.

*Primary Examiner* — Carlos Garcia
(74) *Attorney, Agent, or Firm* — Weisberg I.P. Law, P.A.

(57) ABSTRACT

Systems, methods, and devices are described herein. An example system is disclosed. The system includes at least one computing device configured to communicate with a premises monitoring system located at a premises. The at least one computing device is further configured to determine that a plurality of authentication factors associated with a person at the premises monitoring system have been satisfied, determine a respective weight of a plurality of weights for each of the plurality of authentication factors, determine a security factor for the premises monitoring system, calculate an authentication value for the person (Continued)

based on the security factor and the plurality of weights for the plurality of authentication factors, determine that the authentication value meets a predefined authentication threshold, and in response to determining that the authentication value meets the predefined authentication threshold, deem the person authenticated.

20 Claims, 4 Drawing Sheets

(56) References Cited

U.S. PATENT DOCUMENTS

| | | | | |
|---|---|---|---|---|
| 9,426,139 | B1 * | 8/2016 | McClintock | G06F 21/40 |
| 9,912,657 | B2 * | 3/2018 | Dasgupta | H04L 63/08 |
| 10,026,317 | B2 * | 7/2018 | Perkins | B60W 50/0097 |
| 10,042,993 | B2 * | 8/2018 | Beigi | G06F 21/32 |
| 10,573,171 | B2 * | 2/2020 | VanBlon | G08C 17/02 |
| 10,750,128 | B2 * | 8/2020 | Fu | H04N 7/0806 |
| 10,832,509 | B1 * | 11/2020 | Read | G07C 9/20 |
| 10,885,596 | B1 * | 1/2021 | Woodard | G07C 9/00571 |
| 11,727,740 | B1 * | 8/2023 | Bodurka | G07C 9/27 340/5.7 |
| 11,783,655 | B1 | 10/2023 | Else et al. | |
| 2009/0125406 | A1 * | 5/2009 | Lewis | G06Q 20/203 705/23 |
| 2010/0131273 | A1 * | 5/2010 | Aley-Raz | G10L 17/24 704/247 |
| 2013/0167212 | A1 * | 6/2013 | Azar | G06F 21/32 348/77 |
| 2016/0014103 | A1 * | 1/2016 | Masters | G07C 9/00571 340/5.61 |
| 2017/0004112 | A1 * | 1/2017 | Chippada | G07C 3/00 |
| 2018/0082304 | A1 * | 3/2018 | Summerlin | G06Q 20/4016 |
| 2019/0272691 | A1 * | 9/2019 | Nye | G07C 9/38 |
| 2019/0327448 | A1 | 10/2019 | Fu et al. | |
| 2020/0126545 | A1 * | 4/2020 | Kakkar | G06V 10/764 |
| 2021/0272405 | A1 * | 9/2021 | Gallagher | G07C 9/33 |
| 2021/0365420 | A1 * | 11/2021 | Sahu | G06N 20/00 |
| 2022/0026260 | A1 * | 1/2022 | Nance | G01G 19/44 |
| 2022/0269768 | A1 | 8/2022 | Werner et al. | |
| 2022/0292902 | A1 | 9/2022 | Khadloya et al. | |

* cited by examiner

DYNAMIC MULTI-FACTOR AUTHENTICATION FOR PREMISES ACCESS

TECHNICAL FIELD

The technology of the present disclosure is generally related to authentication for access to a premises.

BACKGROUND

Some homes and businesses have premises monitoring systems, such as security alarm systems that monitor for intrusions, smoke, carbon monoxide, etc. Some premises monitoring systems may include electronic door locks with numeric keypads. A person can use the keypad to input a numerical code to cause the electronic lock to lock or unlock. The numerical code can also be shared with others to facilitate them gaining access to the home or business for various reasons.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
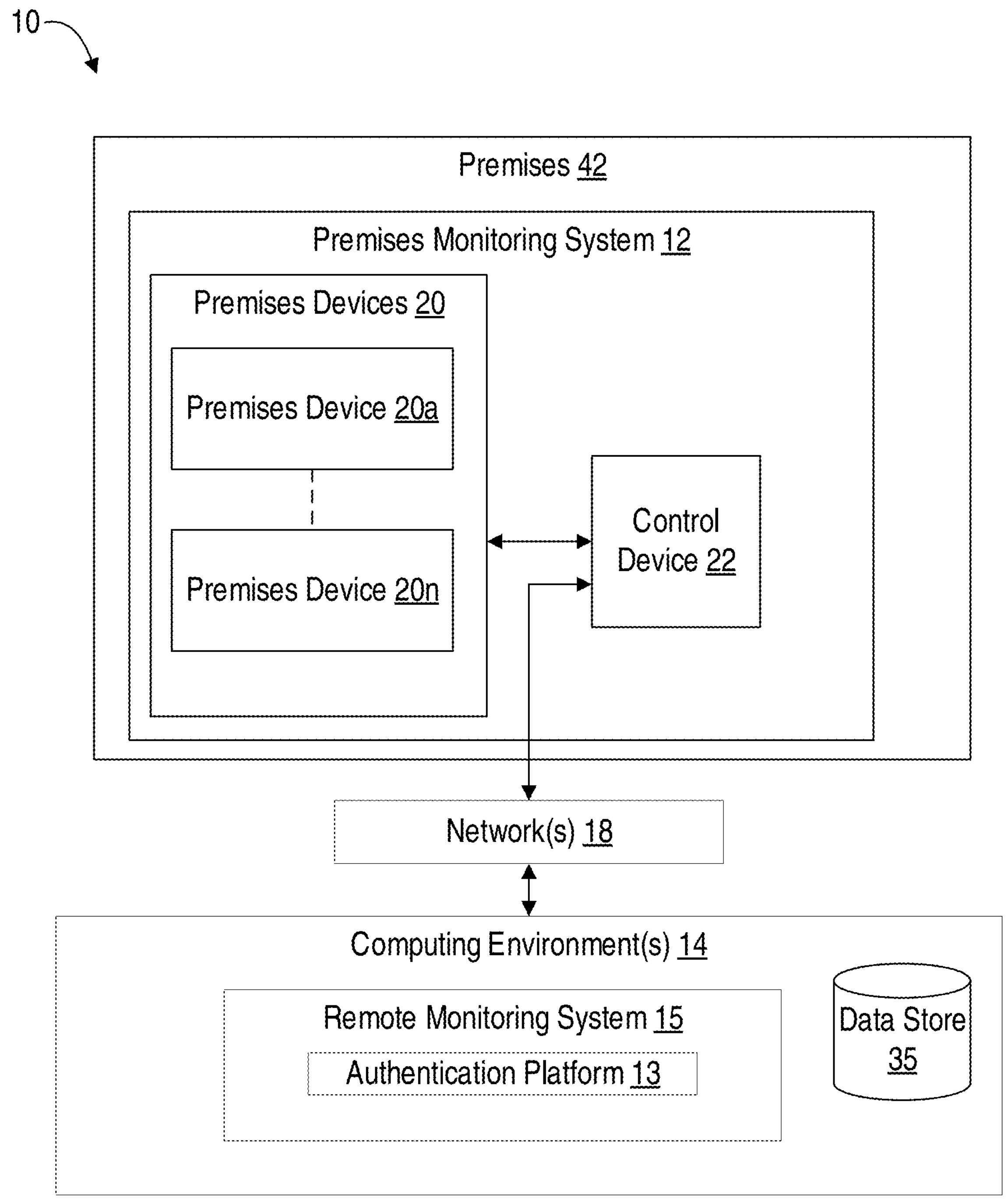
FIG. 1 is a block diagram of an example of a networked environment according to various embodiments of the present disclosure.

With reference to FIG. 1, there is shown a diagram of an example of a networked environment 10 according to some embodiments of the present disclosure. The networked environment 10 may include premises monitoring system 12 and one or more computing environments 14 that may be in communication with each other via one or more networks 18 (collectively referred to as network 18). Premises monitoring system 12 may be configured to provide functionality relating to monitoring a premises 42. For example, premises monitoring system 12 may be used to detect burglaries, smoke, fires, carbon monoxide leaks, water leaks, etc., and report detected events to remote monitoring system 15 of computing environment 14. That is, according to various embodiments, the premises monitoring system 12 may be, for example, a burglary alarm system, an alarm system for monitoring the safety of life and/or property, a home automation system, and/or other types of systems for premises monitoring. Examples of home automation functionality include thermostat control, door lock control, lighting control, appliance control, entertainment system control, etc.

Premises monitoring system 12 comprises one or more premises devices 20*a*-20*n* (collectively referred to as premises devices 20) for monitoring the premises 42. Premises devices 20 may include sensors, image capture devices, audio capture devices, life safety devices, premises automation devices, and/or other devices. For example, the types of sensors may include various life safety-related sensors, such as motion sensors, fire sensors, carbon monoxide sensors, flooding sensors, contact sensors, and other sensor types. Image capture devices may include still cameras and/or video cameras (video doorbell camera), among other image capture devices. Premises automation devices may include lighting devices, climate control devices, and other types of devices. Premises devices 20 may be configured for sensing one or more aspects of premises 42, such as an open or closed door, open or closed window, motion, heat, smoke, gas, sounds, images, people, animals, objects, etc. In one or more embodiments, premises device 20 is a door lock device that is in communication with control device 22 and configured to lock or unlock a door at premises 42.

Premises monitoring system 12 further comprises control device 22 that may be configured for controlling and/or managing the premises monitoring system 12 and/or premises devices 20. To this end, control device 22 may include components, such as a keypad, buttons, display screen, buzzer, and/or speaker, that may facilitate a user interacting with control device 22. In some embodiments, control device 22 may be an alarm system control panel, a keypad, or a home automation hub device. Additionally, a control device 22 in some embodiments may include a personal computer, smart phone, tablet computer, etc., with an application, such as a web browser or dedicated application, that facilitates controlling and/or managing the premises monitoring system 12 and/or premises devices 20. Control device 22 and premises devices 20 may communicate with each other using various protocols and network topologies. For example, control device 22 and premises devices 20 may wirelessly communicate using communications compliant with one or more versions of the Z-Wave protocol, Zigbee protocol, Wi-Fi protocol, Thread protocol, Bluetooth protocol, Digital Enhanced Cordless Telecommunications (DECT) protocol, and/or other protocols.

Control device 22 may be in communication with computing environment 14 via one or more networks 18. Network 18 can include, for example, one or more intranets, extranets, wide area networks (WANs), local area networks (LANs), wired networks, wireless networks, satellite networks, Data Over Cable Service Interface Specification (DOCSIS) networks, cellular networks, Plain Old Telephone Service (POTS) networks, and/or other types of networks.

Further, computing environment 14 may include remote monitoring system 15, authentication platform 13 and data store 35. In one or more embodiments, authentication platform 13 is part of and/or a sub-component of remote monitoring system 15. Remote monitoring system 15 may be configured to provide remote monitoring services for multiple premises monitoring systems 12. For example, in the event that an open door, open window, glass break, etc. is detected by a premises device 20 when premises monitoring system 12 is in an armed state, premises monitoring system 12 may transmit an alarm signal to remote monitoring system 15. In response, the remote monitoring system 15 and/or a human agent associated with remote monitoring system 15 may notify a public safety answering point (PSAP) for first responders, such as police, fire, emergency medical responders, etc., and/or one or more designated users associated with the premise monitoring system 12 via electronic messages and/or telephone calls.

Authentication platform 13 of remote monitoring system 15 may be configured to allow temporary access (e.g., time-based access, alarm-based access, event-based access, guest access, etc.) to premises 42 to one or more people based on whether an authentication request is valid. One or more authentication criterion (e.g., thresholds, weights, etc.) may be stored in data store 35.

Further, authentication platform 13 may be configured to perform functionality related to granting access, if any, to an authenticated person. For example, authentication platform 13 may be configured to authenticate a person based on, for example, an authentication value satisfying an authentication threshold, and in response, perform at least one action as described herein.

Data store 35 may be configured to store various information and/or data associated with authenticating a person as described herein. For example, data store 35 may store at least one authentication criterion (e.g., a rule) that specifies one or more conditions required for a person to be deemed authenticated for the purpose of granting the person access to premises 42. In some embodiments, the authentication criteria define one or more rules that must be satisfied for a person to be deemed authenticated for the purpose of granting access to premises 42. One example of a rule requires a person to meet multiple authentication criteria, such as facial recognition and the detected presence of the person's mobile device where one or more weights are applied to these security factors.

Figure 2:
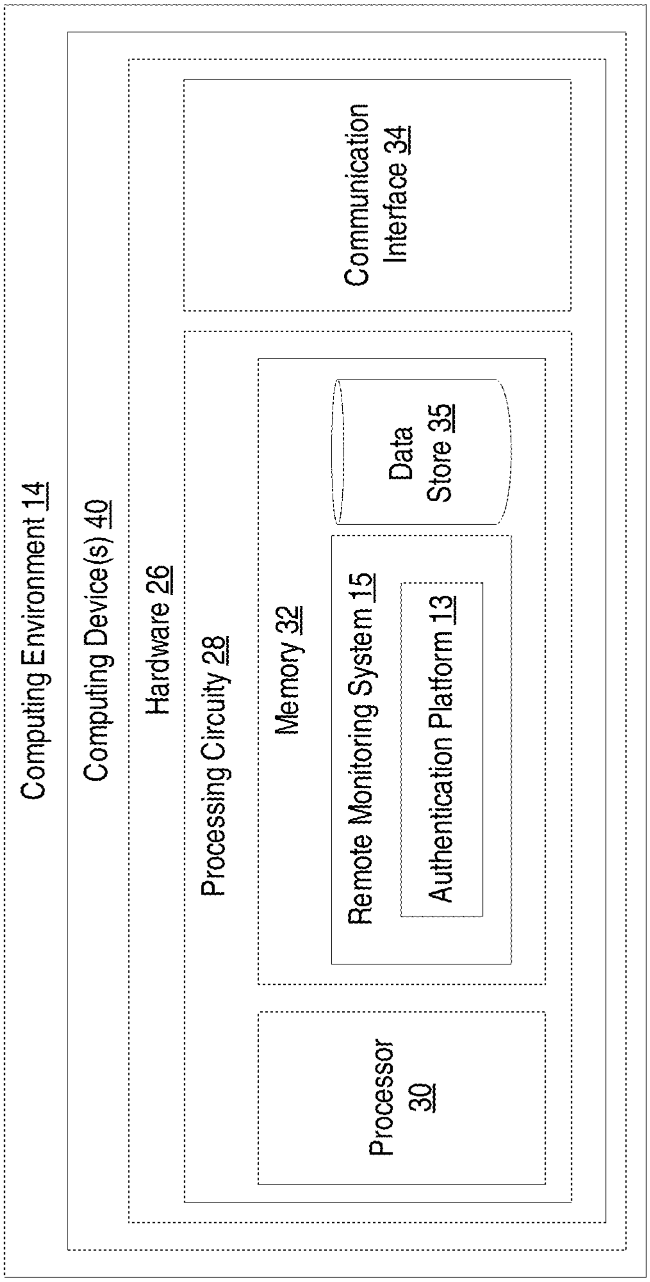
FIG. 2 is a block diagram of an example authentication platform according to various embodiments of the present disclosure.

FIG. 2 is a block diagram illustrating the example computing environment 14 according to various embodiments. As shown, the computing environment 14 may include one or more computing devices 40. In embodiments using multiple computing devices 40, the computing devices 40 may be located in a single installation or may be distributed among many different geographic locations. As shown, each computing device 40 comprises hardware 26. The hardware 26 may include processing circuitry 28. The processing circuitry 28 may include one or more processors 30 and one or more memories 32. Each processor 30 may include and/or be associated with one or more central processing units, data buses, buffers, and interfaces to facilitate operation. In addition to or instead of a processor 30 and memory 32, the processing circuitry 28 may comprise other types of integrated circuitry that perform various functionality. Integrated circuitry may include one or more processors 30, processor cores, FPGAs, ASICS, GPUs, SoCs, or other components configured to execute instructions. The processor 30 may be configured to access (e.g., write to and/or read from) the memory 32, which may comprise any kind of volatile and/or nonvolatile memory, e.g., cache, buffer memory, RAM, ROM, optical memory, and/or EPROM. Further, memory 32 may be embodied in the form of one or more storage devices. The processing circuitry 28 may be configured to perform various functionality described herein. For example, computer instructions may be stored in memory 32 and/or another computer-readable medium that, when executed by processor 30, causes the processor 30 to perform various functionality.

Hardware 26 may include communication interface 34 facilitating communication between one or more elements in networked environment 10. For example, communication interface 34 may be configured for establishing and maintaining at least a wireless or wired connection with one or more elements of networked environment 10 such as control devices 22, premises devices 20, etc.

The processing circuitry 28 may be configured to control any of the methods and/or processes described herein and/or to cause such methods, and/or processes to be performed, e.g., in computing environment 14. Processor 30 corresponds to one or more processors 30 for performing computing device 40 functions described herein.

The memory 32 is configured to store data, such as files, remote monitoring system data, and/or other information/data. Also stored in the memory 32 and executable by the processor 30 are the remote monitoring system 15 and authentication platform 13. Although FIG. 2 shows the remote monitoring system 15 and authentication platform 13 being in a single computing device 40, the remote monitoring system 15 and authentication platform 13 may execute in multiple computing devices 40 of the computing environment 14. To perform the functionality of the remote monitoring system 15 and authentication platform 13, the memory 32 may include instructions that, when executed by the processor 30 and/or processing circuitry 28, causes the computing device 40 to perform the functionality performed by the remote monitoring system 15 and authentication platform 13 described herein.

Figure 3:
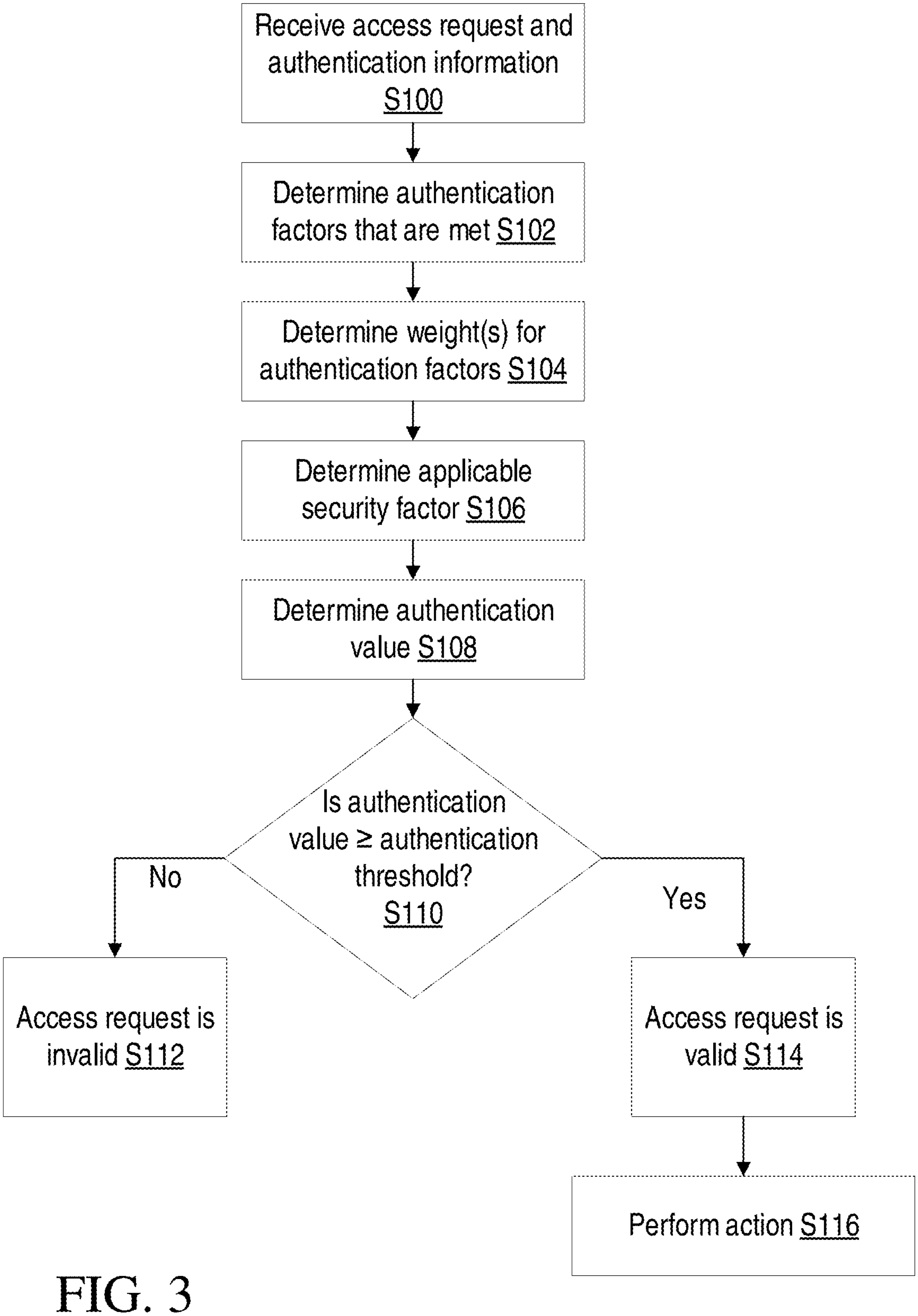
FIG. 3 is a flow diagram of an example process performed by the authentication platform of FIG. 2 according to various embodiments of the present disclosure.

FIG. 3 shows a flow diagram of an example process performed by the authentication platform 13 of FIG. 2. Beginning at block S100, the authentication platform 13 receives an access request associated with a person attempting to access the premises 42 and authentication information relating to the access request, e.g., from the premises device 20 or control device 22. An access request may be, e.g., a request for access to the premises, including but not limited to opening a door on the premises, entering a code via a keypad, or requesting access verbally from a component of the premises monitoring system 12 using a verbal passcode. The authentication platform 13 then determines which one or more authentication factors are met (Block S102). Authentication factors include mechanisms for determining an identity of the person, such as but not limited to facial recognition, a verbal passcode, a passcode entered into a keypad (such as a personal identification number or alphanumeric passcode) or the presence of a mobile device (such as a mobile phone) associated with the person. The presence of the mobile device may be determined, e.g., by detecting a communication signal from the mobile device, such as but not limited to a Bluetooth Low Energy transmission. An authentication factor is met when the authentication information indicates that the authentication factor is satisfied. For example, an authentication factor such as a verbal passcode is met when the authentication information includes a correct verbal passcode.

Next, the authentication platform 13 determines one or more factor weights for the authentication factors that are met (Block S104). Each authentication factor may correspond to one of a plurality of factor weights, and they may be determined using a lookup table that correlates authentication factors with factor weights. Each factor weight may be a predetermined value and may be based on, e.g., relative reliability for authentication. For example, facial recognition can be assigned a relatively high factor weight (e.g., a numerical value of 1.2), verbal passcode can be assigned a relatively high factor weight (e.g. 1.2), mobile device presence detection can be assigned a relatively low factor weight (e.g., 0.08), and keypad passcode can be assigned a relatively low factor weight (e.g., 0.08). In some embodiments, a relatively high factor weight corresponds to the authentication factor being more reliable relative to other authentication factors. In alternative embodiments, a low factor weight corresponds to the authentication factor being more reliable relative to other authentication factors. Additionally, in some embodiments, factor weights may be variable depending on one or more conditions.

Next, the authentication platform 13 determines a security factor (Block S106). A security factor may be a numerical value that is assigned based on various conditions. In some embodiments, the security factor may be a numerical value based at least in part on the identity of the person associated with the access request, which may include a visitor category associated with the person (e.g., "neighbor," or "service provider"). Thus, the security factor may be configured at least in part on a per-person or per-visitor-category basis.

In some embodiments, the security factor may be based at least in part on whether the person has previously been authenticated by the authentication platform 13.

In some embodiments, the security factor may be based at least in part on a schedule. For example, the security factor associated with a person may vary according to a schedule. The security factor may be a first value during one or more scheduled time windows, such as when it may be expected that the person might request access to the premises 42, and a different value outside the one or more scheduled windows, when it is not expected that the person might request access to the premises 42. Accordingly, the requirements for authenticating the person during the one or more scheduled windows may be less strict, relatively, than outside the one or more scheduled windows.

In some embodiments, the security factor may be based at least in part on whether a triggering event has been detected, e.g., by a premises device 20 of the premises monitoring system 12. Thus, the security factor may be a first value when no triggering event has been detected, and a second value when a triggering event has been detected. Non-limiting examples of triggering events include a water leak, a gas leak, fire, or delivery of a package. In addition, the triggering event may be related to a state of the premises monitoring system 12, such as whether the premises monitoring system 12 is armed, disarmed, or an alarm has occurred.

With further reference to FIG. 3, next the authentication platform 13 determines an authentication value based on the weighted authentication factors that are met and on the determined security factor (Block S108). If the authentication value meets the threshold, e.g., it is greater than or equal to the threshold (Block S110), the access request is determined to be valid (Block S112), or else the access request is determined to be invalid (Block S114).

The following discussion provides examples of functionality described above with respect to Blocks S108 through S114. In these examples, the following formula is used to determine authentication values:

$$V = \sum_{n=1}^{N} \frac{1}{S} * w_n$$

wherein V is the authentication value, N is the total number of authentication factors that have been satisfied, S is the security factor, and $w_n$ is the factor weight for the $n^{th}$ security factor that has been satisfied. The specific numerical values in the following examples are for illustrative purposes, and actual values used in various embodiments may differ.

In a first example scenario, the person associated with the access request is a dog walker. The authentication platform 13 also determines that the person's mobile device has been detected as being present (with a corresponding factor weight of 0.8), and facial recognition of the person has been satisfied (with a corresponding factor weight of 1.2). The authentication platform 13 determines that the person is attempting to access the premises 42 during a scheduled window, i.e., when it is anticipated that the person may request access. The authentication platform 13 thus determines that, for the person during the scheduled window, the applicable security factor is 3. Accordingly, the authentication platform 13 determines that the authentication value as follows:

$$\left(\frac{1}{3} * 0.8\right) + \left(\frac{1}{3} * 1.2\right) = 0.67$$

If the required authentication threshold is 1, then the authentication platform 13 determines that the access request is not valid, as 0.67<1. As used herein, an authentication request is "valid" if it is determined that the access request should be granted.

A second example scenario is identical to the first scenario, except the person additionally enters a verbal passcode (with a corresponding factor weight of 1.2). The authentication value is calculated as follows:

$$\left(\frac{1}{3} * 0.8\right) + \left(\frac{1}{3} * 1.2\right) + \left(\frac{1}{3} * 1.2\right) = 1.07$$

In this case, since 1.07≥1, the access request is determined to be valid.

A third example scenario is identical to the second example scenario, except the person is requesting access to the premises 42 outside of any scheduled window. In this case, a heightened security factor of 4 is applied, and the authentication value is calculated as follows:

$$\left(\frac{1}{4} * 0.8\right) + \left(\frac{1}{4} * 1.2\right) + \left(\frac{1}{4} * 1.2\right) = 0.8$$

In this case, since 0.8<1, the access request is determined to be invalid.

A fourth example scenario is identical to the third example scenario, except the person additionally enters a correct passcode (with a corresponding factor weight of 1.2). The authentication value is calculated as follows:

$$\left(\frac{1}{4} * 0.8\right) + \left(\frac{1}{4} * 1.2\right) + \left(\frac{1}{4} * 1.2\right) + \left(\frac{1}{4} * 1.2\right) = 1.1$$

In this case, since 1.1≥1, the access request is determined to be valid.

In a fifth example scenario, a person associated with the category "neighbor" requests access to the premises 42 when no triggering event has occurred. The authentication platform 13 determines that the person's mobile device is present (with a corresponding factor weight of 0.8) and facial recognition of the person has been met (with a corresponding factor weight of 1.2). Since no triggering event has been detected, the authentication platform 13 assigns a security factor of 2. The authentication value is calculated as follows:

$$\left(\frac{1}{2} * 0.8\right) + \left(\frac{1}{2} * 1.2\right) = 1$$

In this case, since 1≥1, the access request is determined to be valid.

In a sixth example scenario, a person associated with the category "neighbor" requests access to the premises 42 when a triggering event, in this case a water leak, has been detected. The authentication platform 13 determines that facial recognition of the person has been met (with a corresponding factor weight of 1.2). Accordingly, the authentication platform 13 determines that security factor for the person is 1. The authentication value is calculated as follows:

$$\left(\frac{1}{1} * 1.2\right) = 1.2$$

In this case, since 1.2≥1, the access request is determined to be valid. Because of the detection of the triggering event and the resultant security factor, only facial recognition was necessary to determine that the access request is valid.

With further reference to FIG. 3, when the access request is valid, the authentication platform 13 performs at least one action (Block S116). In some embodiments, the authentication platform 13 may, for example, cause a state of the premises monitoring system 12 to change from an armed state to a disarmed state. In some embodiments, the authentication platform 13 may cause a premises device 20 to facilitate the person accessing the premises 42 by, e.g., unlocking one or more access point, disarming an alarm system, or bypassing motion sensors or other sensors.

In some embodiments, the authentication platform 13 may determine whether the access request is valid by comparing the authentication value to multiple authentication thresholds. The authentication platform 13 may determine that the authentication value meets a first authenticated threshold but does not meet a second authentication threshold. By meeting the first authentication threshold, the access request may be determined to be valid, and the authentication platform 13 may grant the person access to only a portion of the premises 42. However, by failing to meet the second authentication threshold, the authentication platform 13 may deny the person access to another portion of the premises 42. For example, the authentication platform 13 may calculate an authentication value of 0.8, which may be sufficient to meet an authentication threshold for access to a portion of the premises 42 adjacent to a front door, but may not be sufficient to meet an authentication threshold for access to the rest of the premises 42. In this case, the authentication platform 13 may cause one or more premises devices 20 to unlock the front door and bypass a zone and/or motion sensors adjacent the front door, but the premises monitoring system 23 may remain armed throughout the rest of the premises 42.

Figure 4:
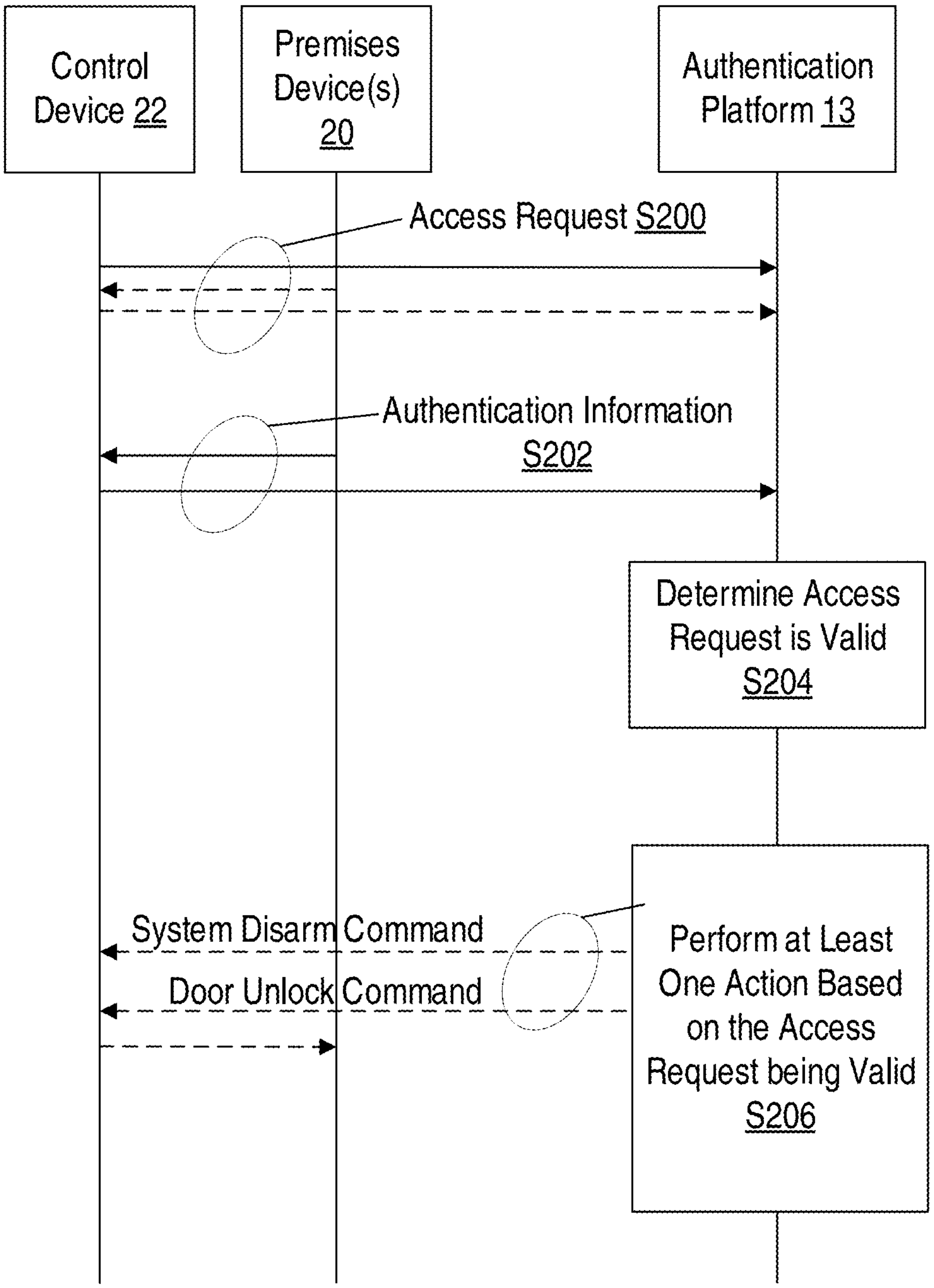
FIG. 4 is a signaling diagram of an example process according to various embodiments of the present disclosure.

FIG. 4 is a signaling diagram depicting an example of a process of the authentication platform 13 authenticating a person and granting the person access to the premises 42. Beginning with block S200, the authentication platform 13 receives an access request from the premises device 20 via the control device 22 and/or from the control device 22. The authentication platform 13 then receives authentication information from the premises device 20 and/or control device 22 (Block S202). At least a portion of the authentication information may be transmitted by the premises device 20 to the control device 22 to then be transmitted to the authentication platform 13. The authentication platform 13 determines whether the access request is valid, as described herein (Block S204). In this example, the authentication platform 13 determines that the access request is valid. The authentication platform 13 then performs one or more actions based on whether the access request is valid, which may be facilitated, e.g., by sending authentication signaling or sending other signaling to the control device 22 to cause the control device 22 to grant entry to the premises 42 in response to the authentication request. For example, the computing device 40 may transmit a system disarm command and/or door unlock command to the control device 22. The control device 22 may then transmit one or more signals to premises device(s) 20, such as an electronic door locks, to disarm and/or unlock doors.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects. Any process, step, action and/or functionality described herein may be performed by, and/or associated to, a corresponding module and/or unit, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system for providing multi-factor authentication of a person for a premises monitoring system, comprising:

at least one computing device comprising:

at least one processor; and at least one computer-readable memory storing a plurality of instructions that, when executed by the at least one processor, are configured to cause the at least one processor to:

determine that a first authentication factor is satisfied for the person, the first authentication factor being based on facial recognition;

determine that a second authentication factor is satisfied for the person, the second authentication factor being based on a verbal passcode;

determine a first weight for the first authentication factor based on at least one lookup table;

determine a second weight for the second authentication factor based on the at least one lookup table;

determine a security factor for the premises monitoring system;

calculate an authentication value for the person based on a sum of the first weight and the second weight divided by the security factor;

deem the person authenticated in response to the authentication value satisfying a predefined authentication value threshold; and cause the premises monitoring system to disarm in response to the person being deemed authenticated.

2. The system of claim 1, wherein the plurality of instructions, when executed by the at least one processor, further cause the at least one processor to cause an electronic door lock to unlock after causing the premises monitoring system to disarm.

3. A system, comprising:

at least one computing device that is configured to communicate with a premises monitoring system located at a premises, the at least one computing device comprising:

at least one processor; and at least one computer-readable memory storing a plurality of instructions that, when executed by the at least one processor, are configured to cause the at least one processor to:

determine that a plurality of authentication factors associated with a person at the premises monitoring system have been satisfied;

determine a respective weight of a plurality of weights for each of the plurality of authentication factors;

determine a security factor for the premises monitoring system, the security factor being a numerical value that is determined based on one or more conditions of the premises monitoring system distinct from the plurality of weights;

calculate an authentication value for the person based on the security factor and the plurality of weights for the plurality of authentication factors where at least one of the plurality of weights is adjusted by the security factor;

determine that the authentication value meets a predefined authentication threshold;

in response to determining that the authentication value meets the predefined authentication threshold, deem the person authenticated; and perform at least one action in response to the person being deemed authenticated.

4. The system of claim 3, wherein the security factor is variable and based on the person.

5. The system of claim 3, wherein the security factor is variable and based on an access schedule associated with the person and a time of day.

6. The system of claim 3, wherein the security factor is variable and based on a triggering event occurring at the premises.

7. The system of claim 6, wherein the triggering event is an emergency event at the premises.

8. The system of claim 6, wherein the triggering event is a delivery of a package at the premises.

9. The system of claim 4, wherein the security factor is variable and based on an alarm state of the premises monitoring system.

10. The system of claim 3, wherein the at least one action comprises:

causing the premises monitoring system to be disarmed; and subsequent to causing the premises monitoring system to be disarmed, causing an electronic door lock at the premises to unlock.

11. The system of claim 3, wherein the at least one action comprises:

causing a subset of a plurality of zones of the premises monitoring system to be bypassed; and causing an electronic door lock at the premises to unlock.

12. A method implemented by a system, the system comprising at least one computing device that is configured to communicate with a premises monitoring system located at a premises, the method comprising:

determining that a plurality of authentication factors associated with a person at the premises monitoring system have been satisfied;

determining a respective weight of a plurality of weights for each of the plurality of authentication factors;

determining a security factor for the premises monitoring system, the security factor being a numerical value that is determined based on one or more conditions of the premises monitoring system distinct from the plurality of weights;

calculating an authentication value for the person based on the security factor and the plurality of weights for the plurality of authentication factors where at least one of the plurality of weights is adjusted by the security factor;

determining that the authentication value meets a predefined authentication threshold;

in response to determining that the authentication value meets the predefined authentication threshold, deeming the person authenticated; and performing at least one action in response to the person being deemed authenticated.

13. The method of claim 12, wherein the security factor is variable and based on the person.

14. The method of claim 12, wherein the security factor is variable and based on an access schedule associated with the person and a time of day.

15. The method of claim 12, wherein the security factor is variable and based on a triggering event occurring at the premises.

16. The method of claim 15, wherein the triggering event is an emergency event at the premises.

17. The method of claim 15, wherein the triggering event is a delivery of a package at the premises.

18. The method of claim 13, wherein the security factor is variable and based on an alarm state of the premises monitoring system.

19. The method of claim 12, wherein the at least one action comprises:

causing the premises monitoring system to be disarmed; and subsequent to causing the premises monitoring system to be disarmed, causing an electronic door lock at the premises to unlock.

20. The method of claim 12, wherein the at least one action comprises:

causing a subset of a plurality of zones of the premises monitoring system to be bypassed; and causing an electronic door lock at the premises to unlock.

* * * * *